(12) United States Patent
Ito et al.

(10) Patent No.: US 9,616,736 B2
(45) Date of Patent: Apr. 11, 2017

(54) ELECTRIC WORK VEHICLE

(71) Applicant: Kubota Corporation, Osaka-shi (JP)

(72) Inventors: Hirokazu Ito, Sakai (JP); Kazuo Koike, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/956,670

(22) Filed: Dec. 2, 2015

(65) Prior Publication Data

US 2016/0297289 A1 Oct. 13, 2016

(30) Foreign Application Priority Data

Apr. 9, 2015 (JP) .................................. 2015-080115

(51) Int. Cl.
| | | |
|---|---|---|
| *B60K 1/04* | (2006.01) | |
| *B60K 7/00* | (2006.01) | |
| *B60K 17/04* | (2006.01) | |
| *B60K 1/02* | (2006.01) | |
| *B60L 11/18* | (2006.01) | |
| *B62D 11/04* | (2006.01) | |
| *B60K 11/06* | (2006.01) | |
| *B60K 1/00* | (2006.01) | |

(52) U.S. Cl.
CPC .................. *B60K 1/04* (2013.01); *B60K 1/02* (2013.01); *B60K 7/0007* (2013.01); *B60K 17/043* (2013.01); *B60L 11/1874* (2013.01); *B62D 11/04* (2013.01); *B60K 11/06* (2013.01); *B60K 2001/005* (2013.01); *B60K 2001/0416* (2013.01); *B60K 2007/0046* (2013.01); *B60K 2007/0061* (2013.01); *B60Y 2200/223* (2013.01)

(58) Field of Classification Search
CPC .......... B60K 1/04; B60K 1/02; B60K 7/0007; B60K 17/043; B60K 2001/005; B60K 2001/0416; B60K 2007/0046; B60K 2007/0061; B60L 11/1874; B62D 11/04; B60Y 2200/223

See application file for complete search history.

(56) References Cited

U.S. PATENT DOCUMENTS

| 6,082,084 A * | 7/2000 | Reimers ................. A01D 69/02 56/10.8 |
|---|---|---|
| 2003/0029149 A1* | 2/2003 | Fillman .................. A01D 34/58 56/10.6 |

(Continued)

*Primary Examiner* — Anne Marie Boehler
*Assistant Examiner* — Marlon A Arce
(74) *Attorney, Agent, or Firm* — The Webb Law Firm

(57) ABSTRACT

An electric work vehicle includes a motor unit including a left motor and a right motor arranged side by side in a transverse direction of the vehicle and connected to a vehicle frame, a left transmission mechanism extending rearward in a fore-and-aft direction of the vehicle from a left side of the left motor to transmit power from the left motor to a left rear wheel, a right transmission mechanism extending rearward in the fore-and-aft direction from a right side of the right motor to transmit power from the right motor to a right rear wheel, and a battery unit housed in a battery casing. The battery casing includes an upper casing extending rearward of the left transmission mechanism and the right transmission mechanism from a top of the motor unit, and a lower casing projecting downward from a bottom of a rear half of the upper casing.

9 Claims, 7 Drawing Sheets

(56) References Cited

U.S. PATENT DOCUMENTS

| | | | | |
|---|---|---|---|---|
| 2013/0015005 A1* | 1/2013 | Koga | ............... | B60L 7/26 |
| | | | | 180/6.5 |
| 2014/0017540 A1* | 1/2014 | Miyawaki | ............ | H01M 2/1016 |
| | | | | 429/99 |
| 2014/0284125 A1* | 9/2014 | Katayama | ............ | B60K 1/04 |
| | | | | 180/68.5 |
| 2015/0144414 A1* | 5/2015 | Tanigaki | ............ | B60K 1/04 |
| | | | | 180/291 |
| 2015/0329174 A1* | 11/2015 | Inoue | ............ | B60K 1/04 |
| | | | | 429/71 |
| 2015/0375977 A1* | 12/2015 | Nakazawa | ............ | B60K 1/00 |
| | | | | 187/222 |
| 2016/0297293 A1* | 10/2016 | Ito | ............ | B60K 1/04 |

\* cited by examiner

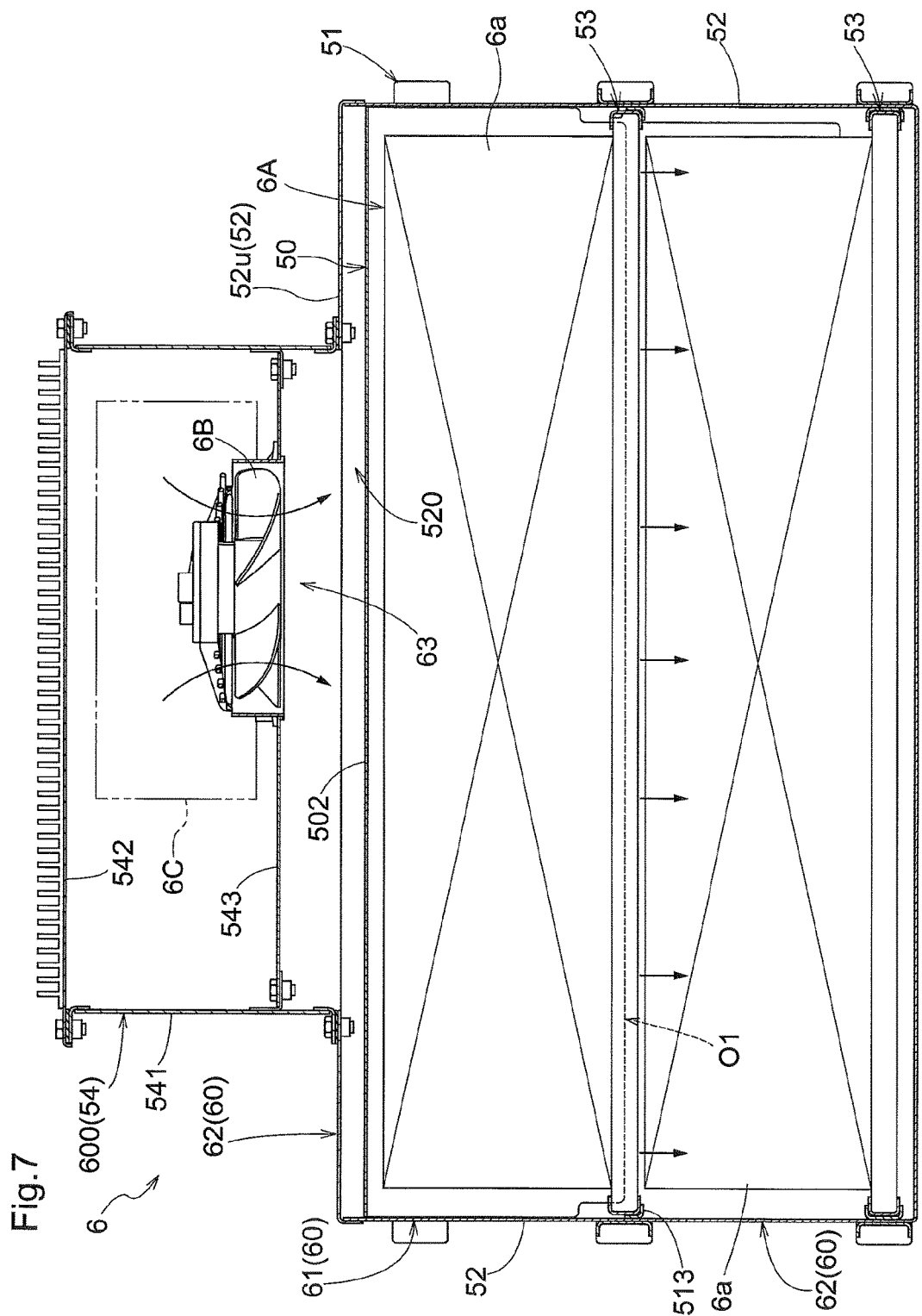

ELECTRIC WORK VEHICLE

CROSS REFERENCE TO RELATED APPLICATION

This application claims priority to Japanese Patent Application No. 2015-080115 filed Apr. 9, 2015, the disclosure of which is hereby incorporated in its entirety by reference.

TECHNICAL FILED OF INVENTION

The present invention relates to an electric work vehicle that propels for performing work operation with an electric motor powered by a battery.

RELATED ART OF INVENTION

Electric vehicles loaded with batteries as a power source and driven by rotary power from electric motors have been widespread in the automobile filed. Also, electric work vehicles propelling while actuating work implements and driving wheels with rotary power from electric motors have begun to emerge. Such a work vehicle includes a large-capacity battery to drive the work implements and the driving wheels, which requires a large space for accommodating the battery. A conventional electric ride-on lawn mower disclosed in U.S. Patent Publication No. 2012/0186887 includes six batteries each placed in a horizontal position on a deck panel fixed to a top surface of a chassis and bolted to the deck panel (see FIG. 2, in particular). A further battery is arranged within a battery casing bolted to a rear bottom part of the chassis. Rectangular arch-shaped protective frames and reinforcement panels are disposed around the six batteries placed on the chassis. Further, a mounting plate is provided above the batteries to receive a battery controller for voltage control of the batteries.

According to the above conventional electric lawn mower, the plurality of batteries are distributed above and below the chassis (vehicle frame), which requires a plurality of mounting structures for the battery side and the vehicle side. Further, the different batteries are arranged in different ways, as a result of which temperature around the batteries provided in a place where air flows easily would be different from temperature around the batteries provided in a place where air flows less easily. This might cause large variance in temperature among the batteries. Thus, each battery requires each cooling system to reduce such variance in temperature among the plurality of batteries, which is inefficient and disadvantageous.

SUMMARY OF INVENTION

Under the circumstances, an electric work vehicle according to the present invention is proposed to achieve an improved battery structure and arrangement. The electric work vehicle includes a vehicle frame supporting a left rear wheel and a right rear wheel, a motor unit including a left motor and a right motor arranged side by side in a transverse direction of the vehicle and connected to the vehicle frame, a left transmission mechanism extending rearward in a fore-and-aft direction of the vehicle from a left side of the left motor to transmit power from the left motor to the left rear wheel, a right transmission mechanism extending rearward in the fore-and-aft direction of the vehicle from a right side of the right motor to transmit power from the right motor to the right rear wheel, a battery casing including an upper casing extending rearward of the left transmission mechanism and the right transmission mechanism from a top surface of the motor unit, and a lower casing projecting downward from a bottom of a rear half of the upper casing, and a battery unit housed in the battery casing.

With the above arrangement, the battery unit having a large weight and volume is arranged to spread and extend over an upper and rear space of the motor unit. More particularly, the upper casing and the lower casing define a substantially L-shape in vertical section along the fore-and-aft direction of the vehicle, which allows the battery casing to position below the vehicle avoiding interference with the motor unit and the right and left transmission mechanisms, and also provides a low center of gravity for the battery unit per se. Such an arrangement reduces an inertial moment of the battery unit relative to a center of rear axle and improves running stability of the vehicle. Further, the structure and arrangement of the right and left transmission mechanisms may be conventional and need not changing, which facilitates restyling of the vehicle as well.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 7 is a vertical sectional view of the battery unit in a transverse direction of the vehicle.

DETAILED DESCRIPTION OF INVENTION

Figure 1:
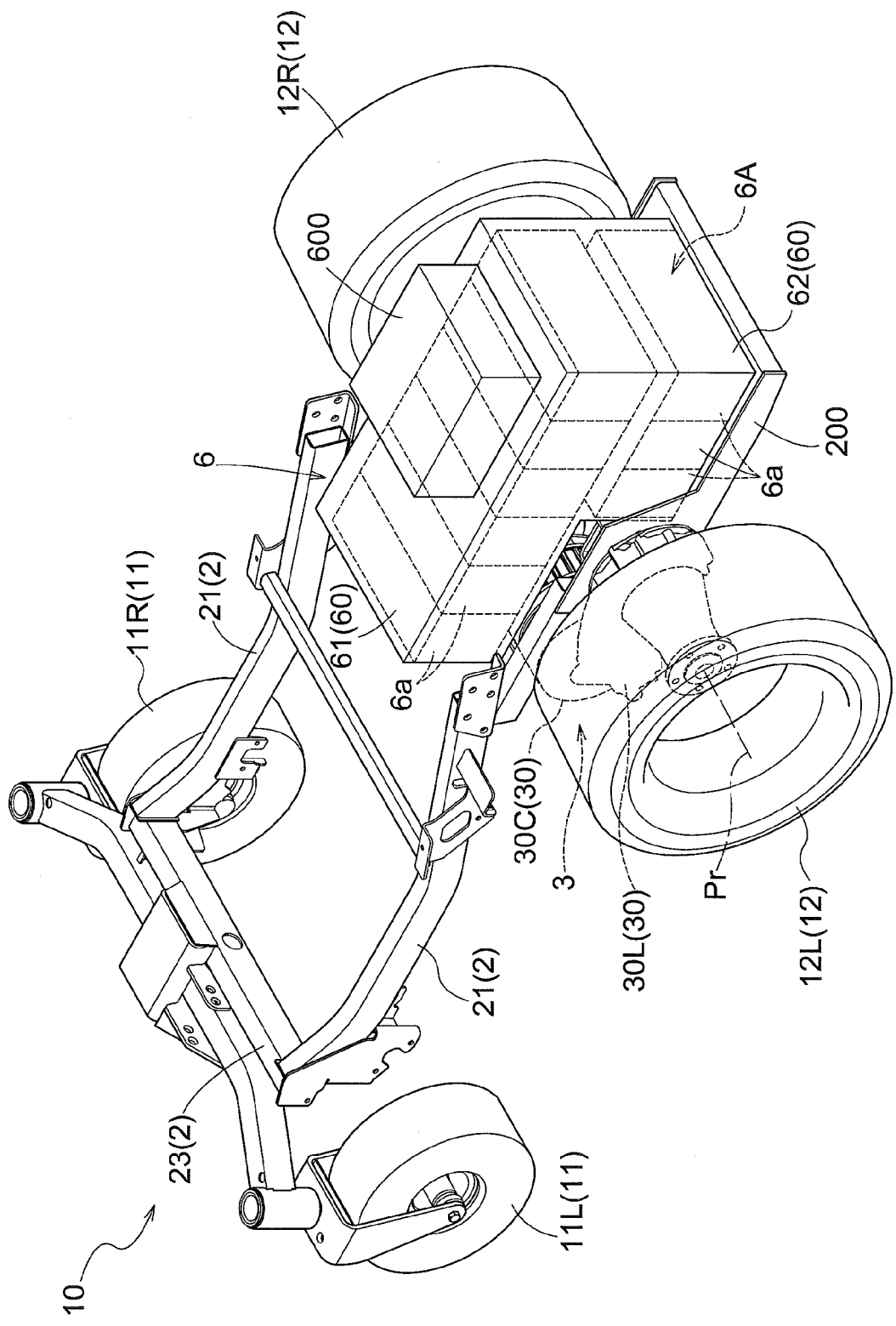
FIG. 1 is a schematic perspective view showing a fundamental arrangement of a battery unit mounted on an electric work vehicle.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Previous to detailed description of an electric work vehicle according to one specific embodiment of the present invention, a fundamental arrangement of a battery unit 6A mounted on the electric work vehicle will be described first in reference to FIGS. 1 and 2.

The battery unit 6A includes at least one battery module 6a and housed in a battery casing 60. The battery unit 6A and the battery casing 60 together form a battery pack 6 acting as a power source for the electric work vehicle. The electric work vehicle includes front wheels 11 consisting of a left front wheel 11L and a right front wheel 11R, rear wheels 12 consisting of a left rear wheel 12L and a right rear wheel 12R, and a vehicle body 10 supported to the ground by the front wheels 11 and rear wheels 12. The battery pack 6 is mounted on the vehicle 10 in a region around the rear wheels. The rear wheels 12 are driving wheels driven by electric power supplied from the battery pack 6.

Figure 2:
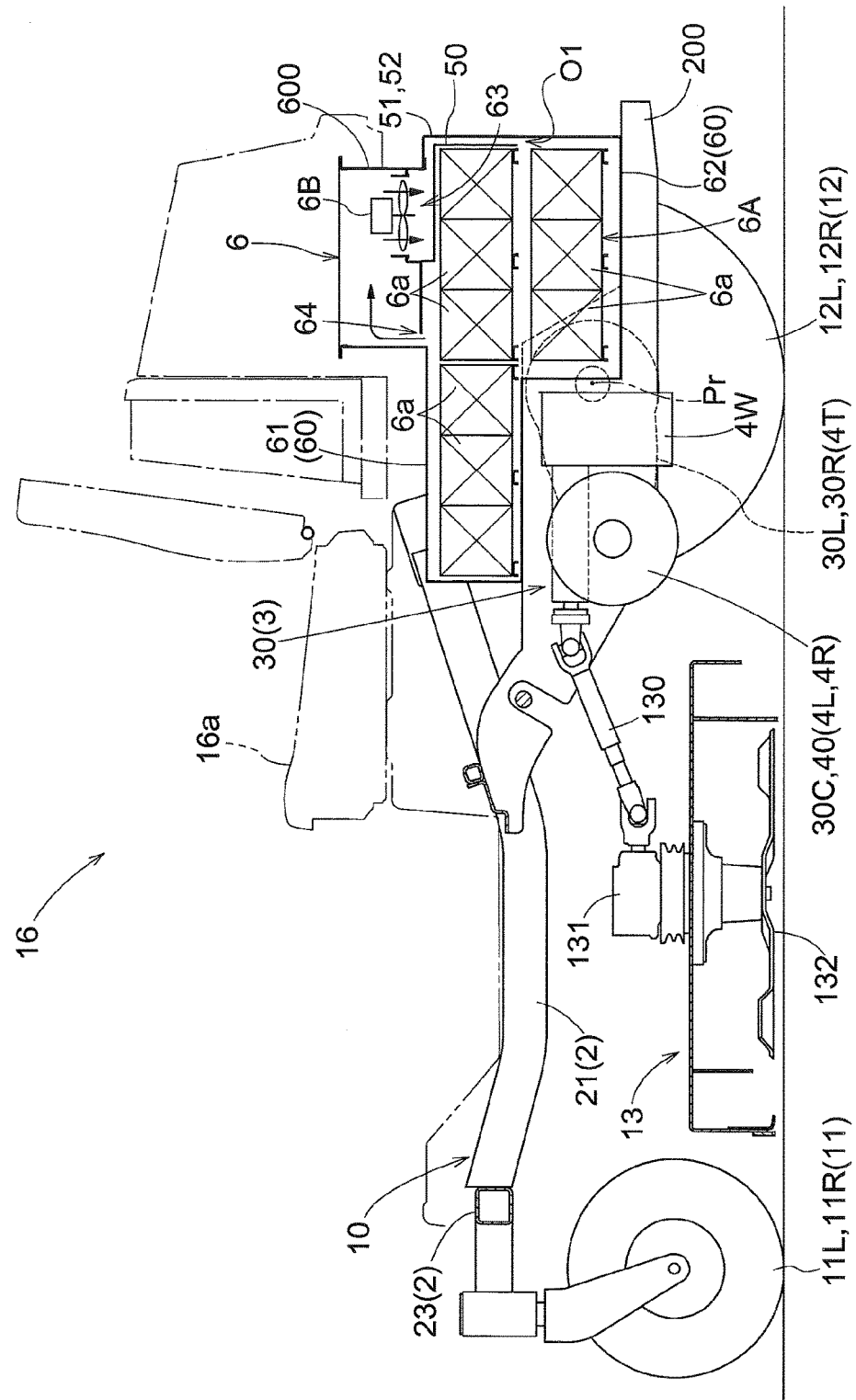
FIG. 2 is a schematic side view showing the fundamental arrangement of the battery unit mounted on the electric work vehicle.

The battery casing 60 shown in FIGS. 1 and 2 is a one-piece component made of sheet material and profiles, but will be described as a structure consisting of an upper casing 61 and a lower casing 62. Meanwhile, the battery casing 60 may have an assembly structure including a plurality of components connected to each other.

Referring to FIG. 1, the upper casing 61 has a substantially rectangular, flat shape with a height smaller than a length (dimension along a fore-and-aft direction of the vehicle) and a width (dimension along a transverse direction perpendicular to the fore-and-aft direction of the vehicle). The lower casing 62 extends downward from a rear half of the upper casing 61, and has a rectangular shape with substantially the same height and width as those of the upper casing 61 and with a length smaller than that of the upper casing 61. In other words, the lower casing 62 forms a projection extending downward from a bottom of the rear half of the upper casing 61. The upper casing 61 and the lower casing 62 define a substantially L-shape in vertical section along the fore-and-aft direction of the vehicle. The battery casing 60 is tight closed to the extent to prevent grass clippings or dust from entering the interior thereof or limit air communication between the interior and the exterior thereof. In the interior of the battery casing 60 are housed a plurality of (typically several to ten) battery modules 6a forming the battery unit 6A with gaps therebetween for allow air flows. Thus, the battery casing 60 is similar to the battery unit 6A in outer configuration, but is slightly larger than the battery casing 60. In FIG. 1, the upper casing 61 and the lower casing 62 have rear end surfaces that are continuously flat in the vertical direction. Alternatively, those surfaces may have an inclination or a step.

As shown in FIG. 1, the electric work vehicle includes a vehicle frame 2 consisting of a left frame 21, a right frame 22, and at least one cross beam 23. The left front wheel 11L and the right front wheel 11R are supported to a front part of the vehicle frame 2, and the left rear wheel 12L and the right rear wheel 12R are supported to a rear part of the vehicle frame 2. A motor unit 40 is disposed inside the vehicle frame 2 and connected to the vehicle frame 2. The motor unit 40 includes a left motor 4L and a right motor 4R arranged side by side in the transverse direction of the vehicle. A transmission 4T includes a left transmission mechanism 43 and a right transmission mechanism 44. The left transmission mechanism 43 extends rearward in the fore-and-aft direction from a left side of the left motor 4L to transmit power from the left motor 4L to the left rear wheel 12L. The right transmission mechanism 44 extends rearward in the fore-and-aft direction from a right side of the right motor 4R to transmit power from the right motor 4R to the right rear wheel 12R. A casing structure 30 acts as a housing for the motor unit 40 as well as the left transmission mechanism 43 and the right transmission mechanism 44. The casing structure 30 is gate shaped as viewed from the top and includes a left casing 30L, a right casing 30R, and a central casing 30C connecting the left casing 30L to the right casing 30R.

More particularly, the motor unit 40 is housed in the central casing 30C, the left transmission mechanism 43 is housed in the left casing 30L, and the right transmission mechanism 44 is housed in the right casing 30R. Here, the central casing 30C is a component forming the motor unit 40, the left casing 30L is a component forming the left transmission mechanism 43, and the right casing 30R is a component forming the right transmission mechanism 44. The central casing 30C, the left casing 30L and the right casing 30R are integrated into the casing structure 30, which functions as the common housing for the motor unit 40, the left transmission mechanism 43, and the right transmission mechanism 44. The casing structure 30 is connected to the vehicle frame 2, and thus functions as the cross beam with high rigidity for the vehicle frame 2.

The battery pack 6 consisting of the battery unit 6A and the battery casing 60 is attached to a rear part of the vehicle frame 2 to extend rearward from a region between the left rear wheel 12L and the right rear wheel 12R. The battery pack 6 is arranged such that a front part of the upper casing 61 has a bottom surface extending along a top surface of the motor unit 40. The lower casing 62, which projects downward from the bottom of the rear part of the upper casing 61, extends to substantially the same level as bottom surfaces of the left transmission mechanism 43 and the right transmission mechanism 44 or to substantially the same level as a rear-axle center Pr. The battery casing 60 including the upper casing 61 and the lower casing 62 assumes a solid figure having an L-shape as viewed from a side, in which a small cube is removed from a front lower part of a larger cube. As apparent from FIG. 2, the motor unit 40 enters the space where the small cube is removed. The upper casing 61 of the battery pack 6 overhangs the motor unit 40 to effectively use the above space. The remaining part, the lower casing 62, in particular, of the battery pack 6 is positioned in a space rearward of the motor unit 40. In this arrangement, the remaining part of the battery pack 6, which does not overhang the motor unit 40, is disposed between the left transmission mechanism 43 and the right transmission mechanism 44 to effectively use the space and provides good vehicle balance because of a low center of gravity of the battery pack 6.

When the battery pack 6 has a transverse width larger than a distance between the left transmission mechanism 43 and the right transmission mechanism 44, a part of the upper casing 61, which does not overlap the lower casing 62, is positioned to overhang the motor unit 40, the left transmission mechanism 43 and the right transmission mechanism 44, with the lower casing 62 being positioned rearward of the left transmission mechanism 43 and the right transmission mechanism 44. Any other heavy device such as a motor for a work implement may be disposed in the space defined by the motor unit 40, the left transmission mechanism 43 and the right transmission mechanism 44.

Referring to FIG. 2, the battery pack 6, i.e. the battery unit 6A housed in the battery casing 60, is disposed rearward of the driver's seat 16a located above the vehicle frame 2 in the driver's section 16. Such an arrangement in which the battery unit 6A is disposed under the driver's seat 16a avoids a disadvantage of an increased height of the driver's seat 16a. Meanwhile, the present invention does not exclude an arrangement in which at least part of the battery pack 6 is disposed under the driver's seat 16a.

Referring to FIG. 1, a circulation fan 6B is provided above the battery unit 6A as a circulation system for circulating air within the battery casing 60. The circulation fan 6B is configured to force the air to circulate in the interior of the battery casing 60. An auxiliary casing 600 is additionally provided to project from a top surface of the upper casing 61 for accommodating the circulation fan 6B. Air circulation caused by the circulation fan 6B achieves a uniform temperature distribution in the interior of the battery casing 60, which reduces variation in temperature in the battery modules 6a, and thus, in battery cells forming the battery modules.

Next, an electric work vehicle according to one specific embodiment will be described hereinafter in reference to FIGS. 3 to 5.

Figure 3:
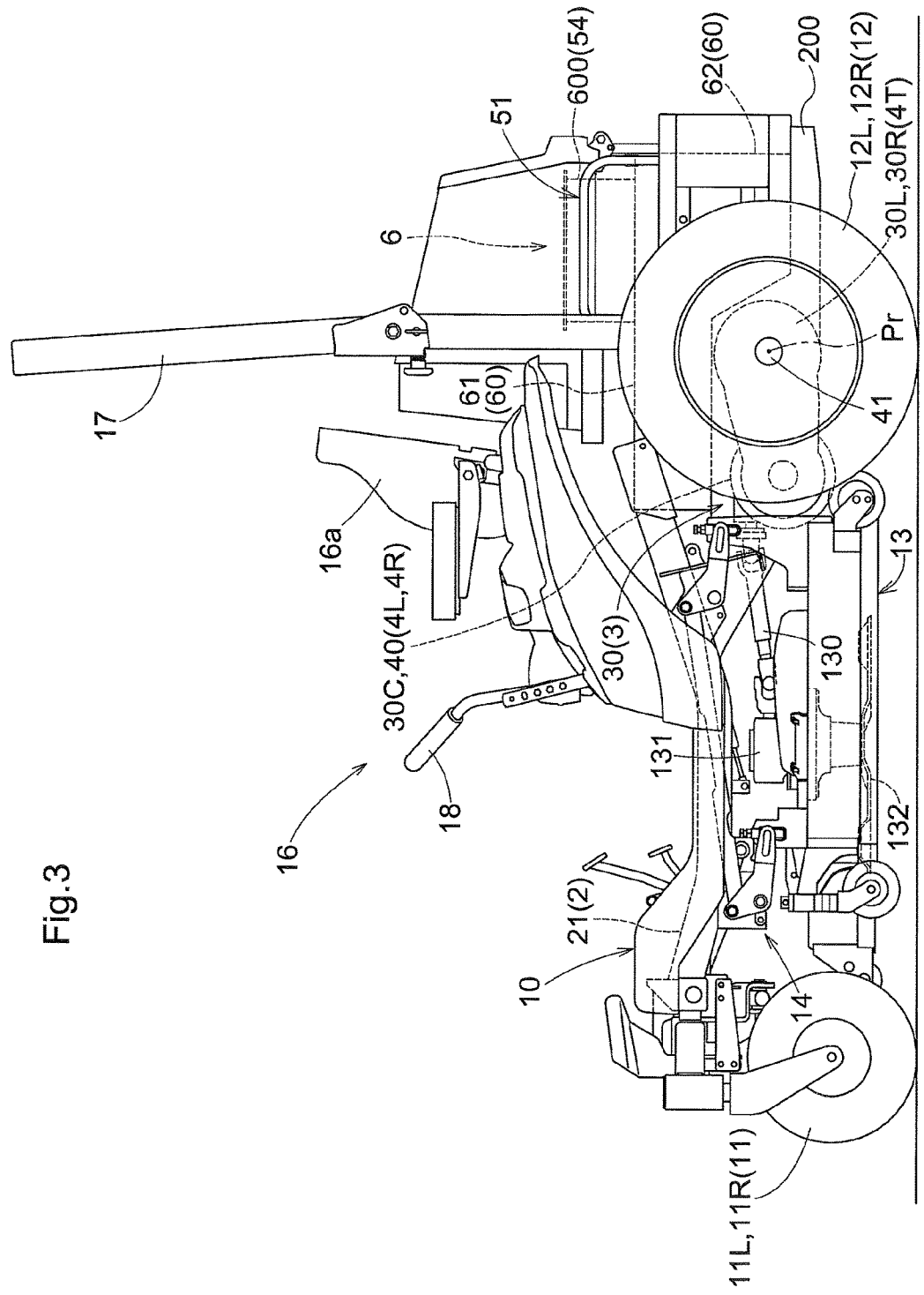
FIG. 3 is a side view of an electric lawn mower.
Figure 4:
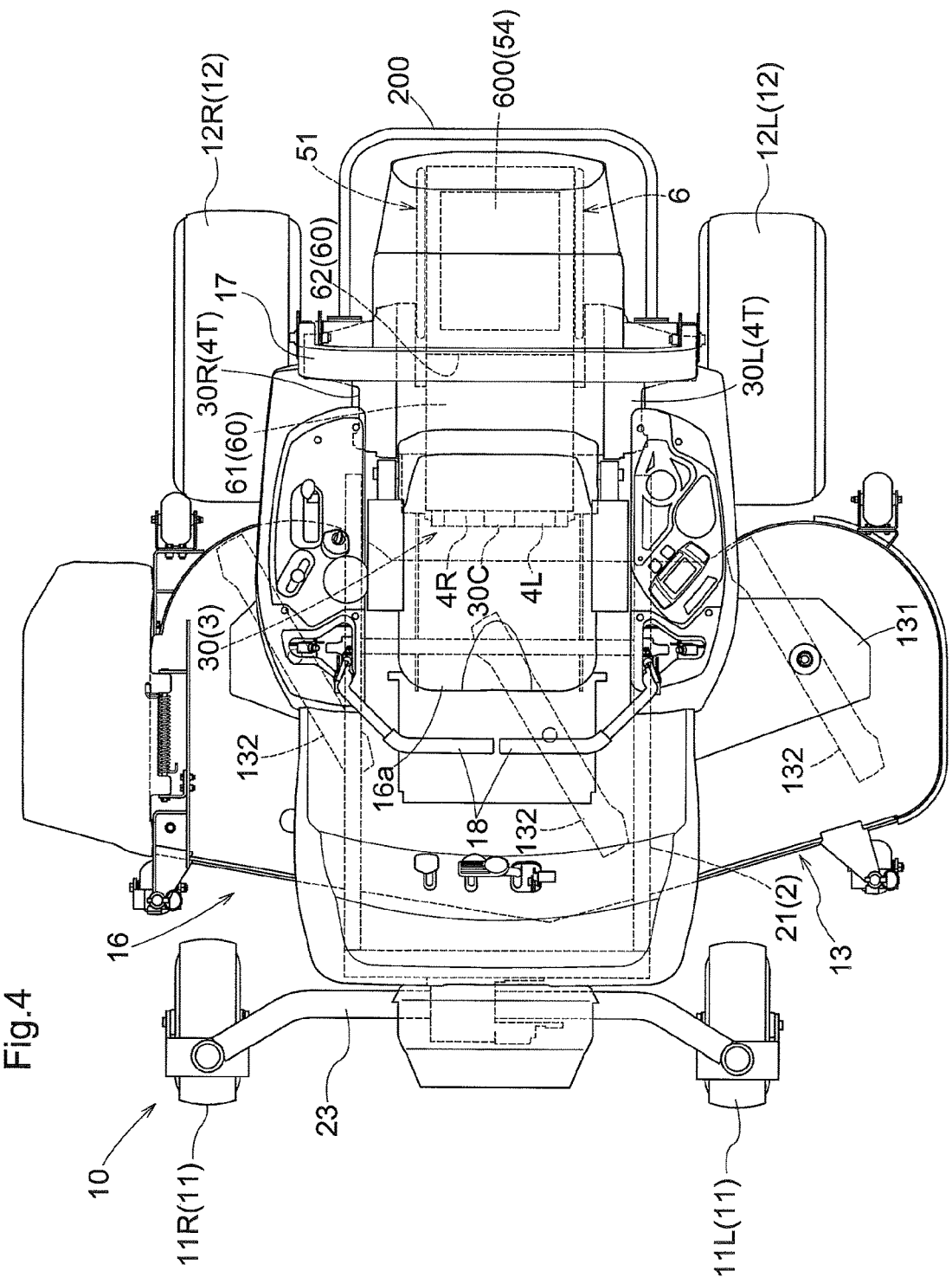
FIG. 4 is a top plan view of the electric lawn mower.

Referring to FIGS. 3 and 4, an electric lawn mower ("lawn mower" hereinafter) includes a vehicle body 10 supported to the ground by front wheels 11 and rear wheels 12 acting as driving wheels. The vehicle body 10 has a vehicle frame 2 acting as a base frame and consisting of a left frame 21 and a right frame 22. A mower unit 13 is suspended from the vehicle frame 2 between the front wheels 11 and the rear wheels 12 via a link mechanism 14. The mower unit 13 includes a blade transmission mechanism 131 and blades 132 propelled by the blade transmission mechanism 131. An operator's section 16 is provided in a central region of the vehicle body 10 in the fore-and-aft direction of the vehicle. With this arrangement, a driver's seat 16a is inevitably mounted on the central region of the vehicle body 10 in the fore-and-aft direction via a seat support.

Figure 5:
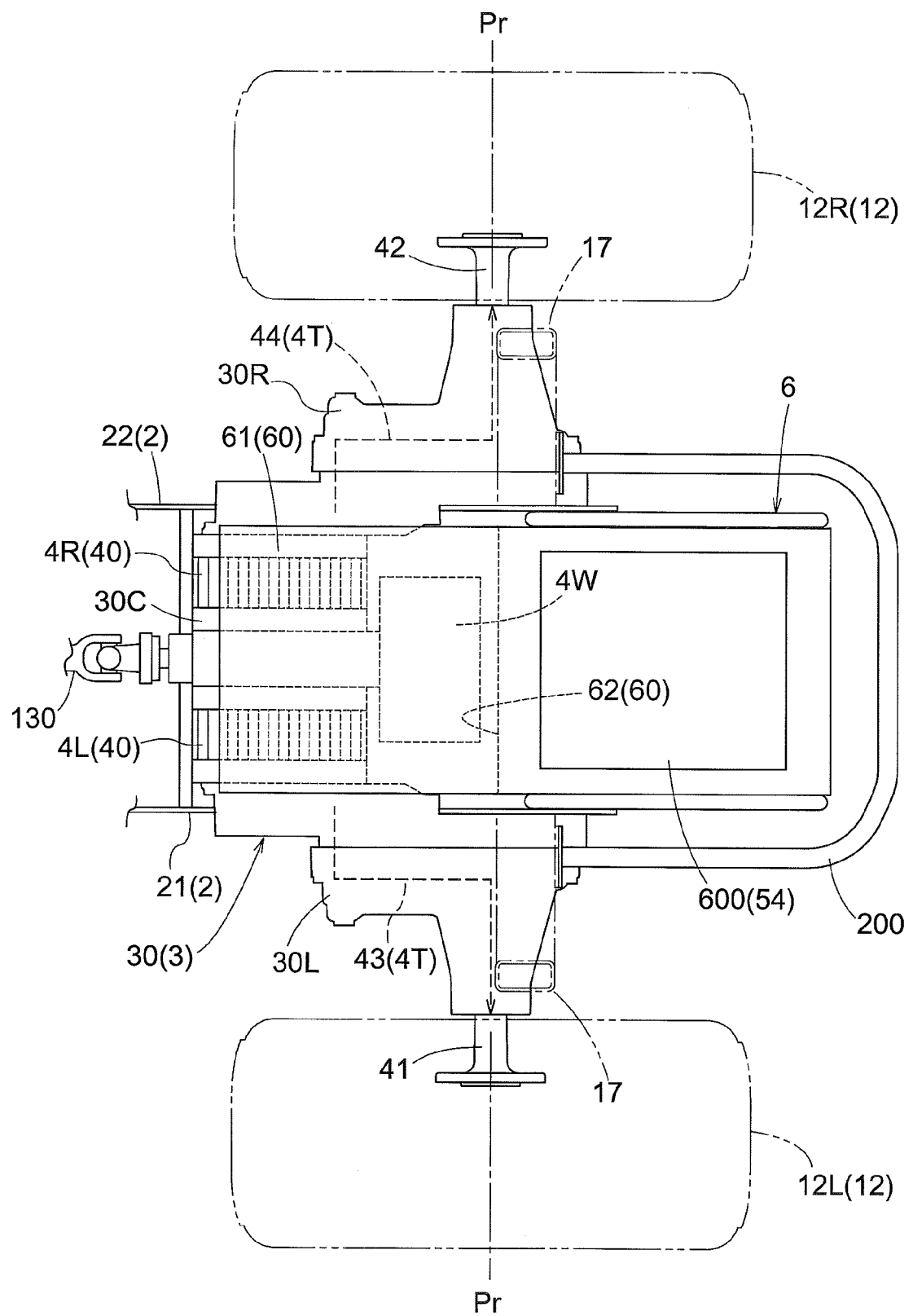
FIG. 5 is a top plan view of the battery unit and motors powered by the battery unit.

Referring to FIG. 5, a driving unit 3 is disposed at a rear part of the vehicle body 10. The driving unit 3 includes a casing structure 30. The casing structure 30 is gate shaped as viewed from the top and includes a left casing 30L, a right casing 30R, and a central casing 30C connecting the left casing 30L to the right casing 30R. The left casing 30L and the right casing 30R extend rearward from the central casing 30C. A left rear-axle casing supporting a left rear axle 41 is formed at an end region of the left casing 30L, and a right rear-axle casing supporting a right rear axle 42 is formed at an end region of the right casing 30R. The casing structure 30 is connected to the vehicle frame 2 and acts as a cross beam 23 of the vehicle frame 2. A battery pack receiving surface 200 is connected to a rear end of the vehicle frame 2 and the casing structure 30 to extend rearward. The battery pack 6, which includes the basic arrangement shown in FIGS. 1 and 2, is placed on the battery pack receiving surface 200.

The central casing 30C functions as a common housing for a left motor 4L for driving the left rear wheel 12 and a right motor 4R for driving the right rear wheel 12, i.e., as a housing of the motor unit 40. A transmission 4T includes a left transmission mechanism 43 for transmitting power from the left motor 4L to the left rear axle 41, and a right transmission mechanism 44 for transmitting power from the right motor 4R to the right rear axle 42. The left casing 30L accommodates the left transmission mechanism 43, and the right casing 30R accommodates the right transmission mechanism 44.

The left motor 4L and the right motor 4R, which form together the motor unit 40, are independently and variably controlled. With such behavior, both the right and left rear wheels 12 are driven forward at substantially the same speed to produce straight forward speed, and both the right and left rear wheels 12 are driven reversely at substantially the same speed to produce straight reverse speed. Further, the right and left rear wheels 12 may be driven at different speeds to turn the vehicle body 10 in a desired direction. For example, while either one of the right and left rear wheels 12 is driven at low speed approximate to zero, the other of the right and left rear wheels 12 is driven forward or reversely at high speed to turn the vehicle with a short turning radius. Further, the right and left rear wheels 12 may be driven in opposite directions to allow the vehicle body 10 to spin-turn the vehicle around a center between the right and left wheels 12. The pair of right and left front wheels 11 are caster wheels that are freely rotatable about vertical axes, which change their positions in response to a running direction of the vehicle body driven by the rear wheels 12.

Referring to FIGS. 2 and 3, a pair of right and left shift levers 18 are provided in opposite sides of the driver's seat 16a to allow shifting operations for the left motor 4L and the right motor 4R. The vehicle stops with the shift levers 18 being maintained at a longitudinal central position. On the other hand, the vehicle is propelled forward with the shift levers 18 being operated forward from the neutral position, and propelled reversely with the shift levers 18 being operated rearward from the neutral position.

A roll-over protective structure (ROPS) 17 is provided rearward of the operator's section 16. The ROPS 17 has an arched shape or inversed U-shape with its opposite free ends being connected to the vehicle frame 2, the left casing 30L, and the right casing 30R.

Referring to FIG. 5, an implement motor 4W for supplying power to the mower unit 13 acting as a work implement is mounted in a space defined by the central casing 30C, the left casing 30L and the right casing 30R. The implement motor 4W has an output shaft extending forward in the fore-and-aft direction of the vehicle to transmit power to the blade transmission mechanism 131 of the mower unit 13 via a relay shaft 130.

A battery pack 6 mounted on the electric work vehicle according to the current embodiment employs the fundamental arrangement shown in FIGS. 1 and 2. More particularly, the battery pack 6 includes a battery casing 60 accommodating a battery unit 6A and consisting of an upper casing 61 positioned above the driving unit 3, and a lower casing 62 extending downward from the upper casing 61. The lower casing 62 is arranged between the left transmission mechanism 43 and the right transmission mechanism 44 in a region rearward of the implement motor 4W disposed rearward of the motor unit 40 to extend rearward. Thus, in the current embodiment, the implement motor 4W is positioned between the motor unit 40 and the lower casing 62. An auxiliary casing 600 is formed on a top surface of the upper casing 61. While the upper casing 61 includes six battery modules 6a, each of which is placed in a horizontal position, arranged in the fore-and-aft direction of the vehicle, the lower casing 62 includes three battery modules 6a, each of which is also placed in the horizontal position, arranged in the fore-and-aft direction of the vehicle. The battery modules 6a include a plurality of lithium-ion battery cells. Power charge and power supply for the battery modules 6a are controlled by a battery control unit 6C housed in the auxiliary casing 600 together with a circulation fan 6B.

Figure 6:
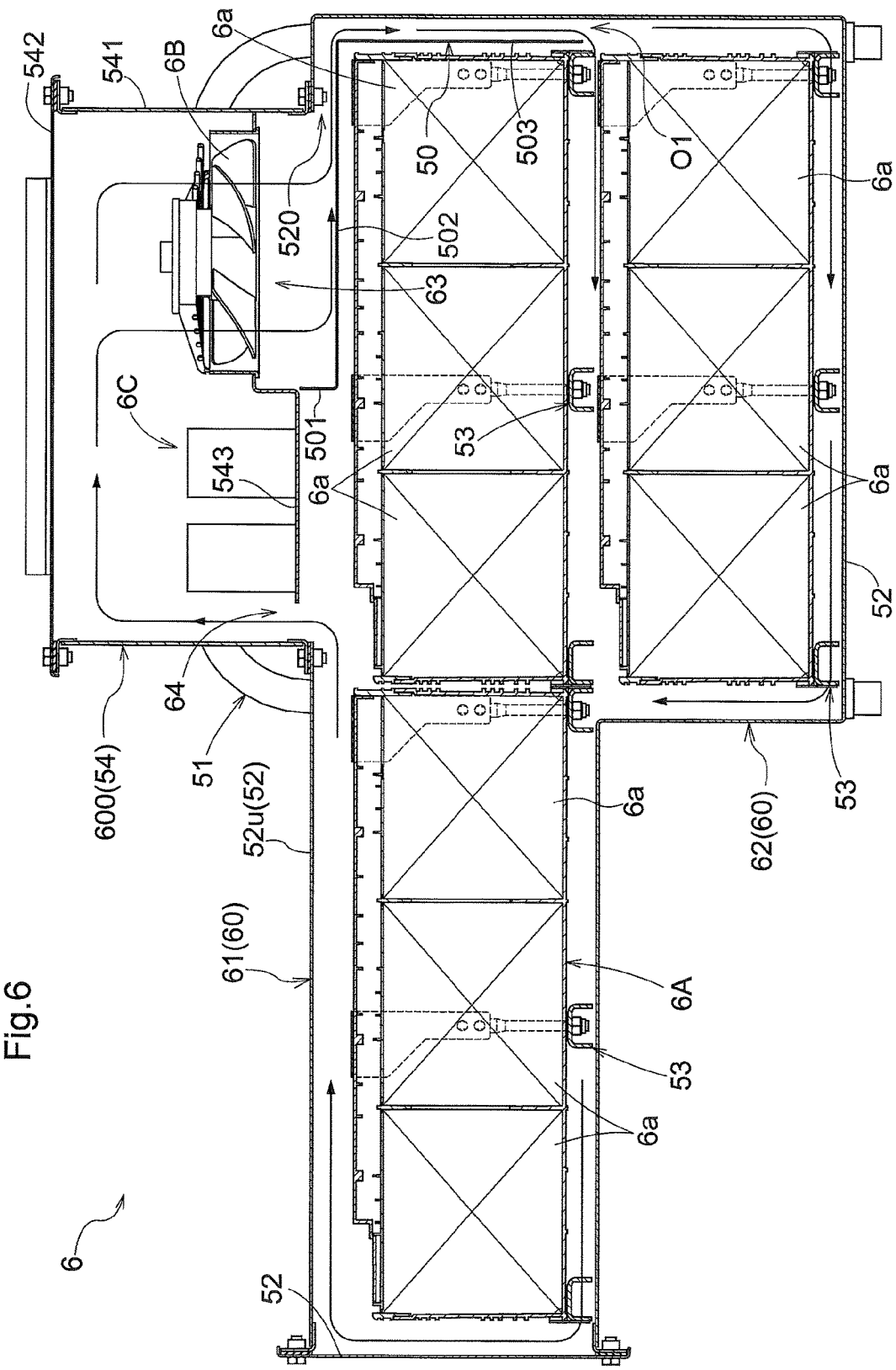
FIG. 6 is a vertical sectional view of the battery unit in a fore-and-aft direction of the vehicle.

Referring to FIGS. 6 and 7, the battery casing 60 includes a battery retainer framework 51 acting as a built of the battery casing 60. The battery retainer framework 51 has external surfaces covered with panels 52 to define a closed inner space that prevents entry of glass clippings or foreign matters.

Referring to FIG. 7, the battery retainer framework 51 has a chest-like structure with a rail 513 for insertibly and removably supporting a pack assembly framework 53 having a unit of battery modules 6a like a drawer. This arrangement allows each unit of the battery modules 6a to be independently inserted into or removed from the battery retainer framework 51.

Referring to FIG. 6, the battery retainer framework 51 further includes an upper frame structure 54 arranged on a panel 52u forming a top surface of the battery retainer framework 51. The upper frame structure 54 is covered with four side walls 541 and a top plate 542 to define a closed inner space that prevents entry of glass clippings or foreign matters. The panel 52u acting as a partition between the battery retainer framework 51 and the upper frame structure 54 has an opening 520.

The upper frame structure 54 includes a receiving plate 543 substantially acting as a bottom plate. The battery control unit 6C and the circulation fan 6B are placed on the receiving plate 543. The circulation fan 6B is an axial flow fan with its blow-off side being oriented to a fan opening 63 formed in the receiving plate 543 to draw air from the above and blow it off downward as cooling air. The cooling air from the circulation fan 6B passes through the opening 520 to the inner space enclosing the battery unit 6A.

Referring to FIG. 6, a return opening 64 is formed in the receiving plate 543 as a through hole, in addition to the fan opening 63, around the battery control unit 6C. The cooling air having passed through the battery unit 6A returns to the inner space of the upper frame structure 54 through the return opening 64.

Further, an air guide 50 is provided for guiding the cooling air blowing off from the fan opening 63 into a gap between the battery unit 6A and the panel 52 covering a side surface of the battery retainer framework 51. The air guide 50 is a bent piece made of sheet material including a rise 501 connected to the receiving plate 543, a horizontal plate 502 extending parallel with the opening plane of the fan opening 63 above the battery unit 6A, and a vertical plate 503 extending vertically along a side of the battery unit 6A.

With the aid of the air guide 50, as shown in arrows in FIG. 6, the cooling air supplied from the circulation fan 6B passes through the gap defined between the panel 52 and one of the side surfaces of the battery unit 6A and enters a gap between vertically-stacked pack assembly frameworks 53 via a lower-end opening O1 to cool the battery modules 6a. Further, the cooling air having passed through the battery unit 6A is drawn by the circulation fan 6B to flow toward a drawing side of the circulation fan 6B and cool components of the battery control unit 6C.

Although not shown, a cable connector is provided in the side wall 541 of the upper frame structure 54 to connect to a power line and a control line.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

ALTERNATIVE EMBODIMENTS

1. In the above embodiment, the battery casing 60 has a transverse width smaller than the transverse distance between the left transmission mechanism 43 and the right transmission mechanism 44 to allow at least part of the lower casing 62 of the battery casing 60 to be accommodated within the space between the left transmission mechanism 43 and the right transmission mechanism 44. Alternatively, the battery casing 60 may have a transverse width larger than the transverse distance between the left transmission mechanism 43 and the right transmission mechanism 44. In that case, the upper casing 61 of the battery casing 60 may overhang the left transmission mechanism 43 and the right transmission mechanism 44, and the lower casing 62 of the battery casing 60 may be disposed rearward of the left transmission mechanism 43 and the right transmission mechanism 44. In any case, when the implement motor 4W is disposed in the space between the left transmission mechanism 43 and the right transmission mechanism 44, the lower casing 62 is positioned so as not to have its front end face interfere with the implement motor 4W.

2. In the above embodiment, the battery unit 6A includes nine battery modules 6a each arranged in the horizontal position, several of which are vertically stacked. However, the number of battery modules 6a is not limited to nine. Further, the battery modules 6a may be arranged in any number of rows or tiers.

3. In the above embodiment, the battery control unit 6C is housed in the battery casing 60 of the battery pack 6 to be cooled by the cooling air from the circulation fan 6B. Instead, the battery control unit 6C may be provided outside the casing 60. Also, a further device may be provided within the casing 60. Further, instead of providing the circulation fan 6B, any other cooling system such as an ambient air introduction system or an air introduction system including an external fan may be employed as an air circulation system for circulating air within the battery casing.

4. In the above embodiment, the lawn mower is described as an example of the electric work vehicle loaded with the battery pack 6. Instead, the electric work vehicle may be agricultural work vehicles such as a rice transplanter, a combine harvester or a tractor, or construction machines such as a backhoe or a bucket loader.

The present invention is not limited to the above described embodiments, and various variations and modifications may be possible without departing from the scope of the present invention.

The present invention is applicable to various electric work vehicles including a motor unit powered by a battery pack and a transmission transmitting power from the motor unit to driving wheels.

What is claimed is:
1. An electric work vehicle comprising:
a left rear wheel and a right rear wheel;
a vehicle frame supporting the left rear wheel and the right rear wheel;
a motor unit including a left motor and a right motor arranged side by side in a transverse direction of the vehicle and connected to the vehicle frame;
a left transmission mechanism extending rearward in a fore-and-aft direction of the vehicle from a left side of the left motor to transmit power from the left motor to the left rear wheel;
a right transmission mechanism extending rearward in the fore-and-aft direction of the vehicle from a right side of the right motor to transmit power from the right motor to the right rear wheel;
a battery casing including an upper casing extending rearward of the left transmission mechanism and the right transmission mechanism from a top surface of the motor unit, and a lower casing projecting downward from a bottom of a rear half of the upper casing; and
a battery unit housed in the battery casing.

2. The electric work vehicle according to claim 1, wherein at least part of the battery casing enters a space defined by the motor unit, the left transmission mechanism and the right transmission mechanism as viewed from the top.

3. The electric work vehicle according to claim 1, wherein the battery casing has a front part positioned above the motor unit, and a rear part entering a space defined by the motor unit, the left transmission mechanism and the right transmission mechanism as viewed from the top.

4. The electric work vehicle according to claim 1, wherein the battery casing is positioned rearward of a driver's seat.

5. The electric work vehicle according to claim 1, wherein the battery unit is tightly housed in the battery casing.

6. The electric work vehicle according to claim 5, further comprising a circulation system for circulating air within the battery casing.

7. The electric work vehicle according to claim 6, wherein the circulation system includes a circulation fan for forcing air to circulate within the battery casing.

8. The electric work vehicle according to claim 1, wherein the battery casing assumes a solid figure having an L-shape as viewed from a side, in which a small cube is removed from a larger cube, the small cube being shaped to receive the motor unit, the left transmission mechanism and the right transmission mechanism.

9. The electric work vehicle according to claim 1, wherein the motor unit, the left transmission mechanism and the right transmission mechanism are provided in an integrated casing structure.

* * * * *